(12) United States Patent
Matsuo

(10) Patent No.: US 11,735,047 B2
(45) Date of Patent: Aug. 22, 2023

(54) RIDE-SHARING SYSTEM AND RIDE-SHARING METHOD

(71) Applicant: TOYOTA JIDOSHA KABUSHIKI KAISHA, Toyota (JP)

(72) Inventor: Yoshiaki Matsuo, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/656,574

(22) Filed: Mar. 25, 2022

(65) Prior Publication Data

US 2022/0309922 A1  Sep. 29, 2022

(30) Foreign Application Priority Data

Mar. 25, 2021 (JP) .................................. 2021-052134

(51) Int. Cl.
| | |
|---|---|
| *G08G 1/127* | (2006.01) |
| *B60W 60/00* | (2020.01) |
| *B60W 30/18* | (2012.01) |
| *G06Q 10/0631* | (2023.01) |
| *G06Q 50/30* | (2012.01) |
| *G08G 1/00* | (2006.01) |

(52) U.S. Cl.
CPC ....... *G08G 1/127* (2013.01); *B60W 30/18163* (2013.01); *B60W 60/00253* (2020.02); *G06Q 10/06314* (2013.01); *G06Q 50/30* (2013.01); *G08G 1/22* (2013.01); *B60W 2556/45* (2020.02)

(58) Field of Classification Search
CPC ... G08G 1/127; G08G 1/22; B60W 60/00253; B60W 30/18163; B60W 2556/45; G06Q 10/06314; G06Q 50/30
See application file for complete search history.

(56) References Cited

U.S. PATENT DOCUMENTS

| | | | | |
|---|---|---|---|---|
| 8,417,860 | B2 * | 4/2013 | Choi ....................... | H04L 67/12 |
| | | | | 710/100 |
| 9,725,083 | B2 * | 8/2017 | Dextreit ................ | B60W 10/06 |
| 9,939,279 | B2 * | 4/2018 | Pan ..................... | G01C 21/3438 |
| 10,353,387 | B2 * | 7/2019 | Stenneth ............. | G05D 1/0297 |

(Continued)

FOREIGN PATENT DOCUMENTS

| | | |
|---|---|---|
| JP | 2000-194417 A | 7/2000 |
| JP | 2005-222144 A | 8/2005 |
| JP | 2020-52890 A | 4/2020 |

*Primary Examiner* — Hussein Elchanti
(74) *Attorney, Agent, or Firm* — Dickinson Wright, PLLC

(57) ABSTRACT

A management server executes interval adjustment processing to adjust a service frequency of a ride-sharing vehicle group. In the interval adjustment processing, it is judged whether or not a vehicle pair composed of two vehicles in a relationship of a preceding vehicle and a following vehicle includes a stopping vehicle that stops in a pick-up and drop-off point as a following vehicle. Further, it is judged whether or not the vehicle pair corresponds to a separated pair. If it is judged that vehicle pair includes the stopping vehicle as the following vehicle and the said vehicle pair corresponds to the separated pair, selection processing to select an overtaking vehicle is executed. The overtaking vehicle is a ride-sharing vehicle that overtakes with the stopping vehicle to cut into between the separated pair. An overtake instruction is transmitted to the overtaking vehicle selected by the selection processing.

8 Claims, 9 Drawing Sheets

(56) References Cited

U.S. PATENT DOCUMENTS

| | | | | |
|---|---|---|---|---|
| 2007/0030212 A1* | 2/2007 | Shibata | G06T 5/50 | 345/9 |
| 2013/0080041 A1* | 3/2013 | Kumabe | G08G 1/22 | 701/117 |
| 2013/0179205 A1* | 7/2013 | Slinin | G06Q 10/06 | 705/7.13 |
| 2013/0235169 A1* | 9/2013 | Kato | G02B 30/34 | 348/53 |
| 2015/0345951 A1* | 12/2015 | Dutta | G01C 21/3605 | 701/400 |
| 2016/0027306 A1* | 1/2016 | Lambert | G08G 1/123 | 701/117 |
| 2016/0117610 A1* | 4/2016 | Ikeda | G06Q 10/02 | 705/5 |
| 2016/0138928 A1* | 5/2016 | Guo | G01C 21/3438 | 701/537 |
| 2016/0321771 A1* | 11/2016 | Liu | G06Q 30/0283 | |
| 2016/0334232 A1* | 11/2016 | Zhuang | G06Q 10/02 | |
| 2017/0036601 A1* | 2/2017 | Kimura | B60R 1/00 | |
| 2017/0305365 A1* | 10/2017 | Matsumoto | B60K 37/06 | |
| 2018/0120861 A1* | 5/2018 | Saxena | G05D 1/0291 | |
| 2019/0044728 A1* | 2/2019 | Karmoose | H04L 9/0643 | |
| 2019/0349719 A1* | 11/2019 | Pattan | H04L 67/55 | |
| 2019/0378418 A1* | 12/2019 | Menadue | H04W 4/46 | |
| 2020/0186290 A1* | 6/2020 | Zhang | H04L 1/0031 | |
| 2020/0249699 A1* | 8/2020 | Kim | G05D 1/0295 | |
| 2021/0264793 A1* | 8/2021 | Shuman | H04W 52/10 | |
| 2022/0061068 A1* | 2/2022 | Liu | H04W 12/76 | |

\* cited by examiner

RIDE-SHARING SYSTEM AND RIDE-SHARING METHOD

CROSS-REFERENCE TO RELATED APPLICATION

The present application claims priority under 35 U.S.C. § 119 to Japanese Patent Application No. 2021-052134, filed Mar. 25, 2021, the contents of which application are incorporated herein by reference in their entirety.

TECHNICAL FIELD

The present disclosure relates to a system and a method for providing a ride-share service.

BACKGROUND

JP2020-52890A discloses a system for managing an operation of a ride-sharing vehicle (specifically, a route bus) which circulates a predetermined route including a plurality of stops. In the system according to the prior art, when a service frequency of two ride-sharing vehicles including a preceding vehicle and a following vehicle is shorter than a threshold, a portion of the traveling route of the following vehicle is modified. A distance of the modified traveling route is longer than that before the modification. That is, when the service frequency is shorter than the threshold the system makes the following vehicle to turn far, thereby the service frequency is adjusted.

SUMMARY

Consider a ride-share service in which an automated drive vehicle as the ride-sharing vehicle is operated along a preset circular route. In the ride-share service, at least two stops are provided on the circular route. At these stops, a pick-up and a drop-off of a user is performed. Hereinafter, each of these stops is also referred to as a "PUDO point". And an operation of a pick-up and/or a drop-off of the user is also referred to as a "PUDO action".

If there are at least three automated drive vehicles, the service frequency of the two vehicles that corresponds to the preceding and following vehicles can be adjusted within a predetermined time range thereby an arrival interval in the PUDO points is roughly maintained to a constant interval. However, if a user takes longer to the PUDO action at the PUDO point, the following issues arise. That is, the service frequency between the vehicle stopping in the PUDO point and the following vehicle is clogged. Alternatively, the service frequency between the vehicle stopping in the PUDO point and the preceding vehicle expands. This makes it becomes difficult to maintain the arrival interval in the PUDO points constant.

It is an object of the present disclosure to provide a technique capable of maintaining the service frequency of the automated drive vehicles within a predetermined time-range in the ride-share service in which at least three automated drive vehicles are operated along the circular route.

A first aspect of the present disclosure is a ride-sharing system for providing a ride-share service and has the following features.

The ride-sharing system comprises a ride-sharing vehicle group and a management server.

The ride-sharing vehicle group is composed of at least three automated drive vehicles running on a circular route including at least two pick-up and drop-off points.

The management server is configured to manage an operation of the ride-sharing vehicle group.

The management server is configured to execute interval adjustment processing to adjust a service frequency of the ride-sharing vehicle group based on operating state information of the ride-sharing vehicle group.

In the interval adjustment processing, the management server is configured to:

judge whether or not a vehicle pair composed of two vehicles in a relationship of a preceding vehicle and a following vehicle contain a stopping vehicle as the following vehicle that stops in any one of the at least two pick-up and drop-off points;

judge whether or not the vehicle pair fall under a separated pair;

when the service frequency of the vehicle pair exceeds a maximum time, determine that the vehicle pair falls under the separated pair;

when it is judge that the vehicle pair includes the stopping vehicle as the following vehicle and the vehicle pair falls under the separated pair, execute selection processing to select from a remaining vehicle group excluding the separated pair from the ride-sharing vehicle group an overtaking vehicle that overtakes the stopping vehicle to cut into the separated pair; and transmit an overtake instruction to the overtaking vehicle selected in the selection processing.

In the selection processing, the management server is configured to:

extract a candidate of the overtaking vehicle from the remaining vehicle group;

judge whether or not a pick-up and/or a drop-off of a user by the candidate is scheduled in a path from an actual position of the candidate to that of the stopping vehicle in the circular route; and when it is judged that the pick-up and/or the drop-off of the user by the candidate is not scheduled, decide the said candidate as the overtaking vehicle.

A second aspect of the present disclosure further has the following features in the first aspect.

In the selection processing, the management server is further configured to:

calculate respective time required from respective actual position of the vehicles constituting the remaining vehicle group to an interrupt position set between the separated pair in the circular route; and extract the candidate in an ascending order of the required time.

A third aspect of the present disclosure further has the following features in the first aspect.

In the interval adjustment processing, the management server is further configured to:

when it is judged that the pick-up and/or the drop-off of the user by the candidate is scheduled in all candidates, transmit a deceleration driving instruction to the remaining vehicle group.

A fourth aspect of the present disclosure further has the following features in the first aspect.

In the interval adjustment processing, the management server is further configured to:

in the transmission of the overtake instruction, transmit an acceleration driving instruction to a remaining vehicle group of the ride-sharing vehicle group excluding the separated pair, the overtaking vehicle, and a ride-sharing vehicle operated between the overtaking vehicle and the stopping vehicle.

A fifth aspect of the present disclosure further has the following features in the fourth aspect.

The overtake instruction includes information of an interrupt position that is set in a middle of actual positions of the separated pair in the circular route.

In the interval adjustment processing, the management server is further configured to:

in the transmission of the overtake instruction, transmit a deceleration driving instruction to the preceding vehicle of the separated pair.

A sixth aspect of the present disclosure further has the following features in the first aspect.

In the interval adjustment processing, the management server is further configured to:

when it is judged that the vehicle pair does not include the stopping vehicle as the following vehicle and the vehicle pair corresponds to the separated pair, transmit a deceleration driving instruction to the preceding vehicle of the separated pair while transmitting an acceleration driving instruction to the following vehicle of the separated pair.

A seventh aspect of the present disclosure further has the following features in the first aspect.

In the interval adjustment processing, the management server is further configured to:

judge whether or not the vehicle pair falls under a proximity pair;

when the service frequency of the vehicle pair exceeds a minimum time, determine that the vehicle pair falls under the proximity pair; and when it is judged that the vehicle pair corresponds to the proximity pair, transmit an acceleration driving instruction to the preceding vehicle of the proximity pair while transmitting a d deceleration driving instruction to the following vehicle of the proximity pair.

An eighth aspect is a ride-share method for providing a ride-share service and has the following features.

The ride-sharing method is performed by a management server which is configured to manage an operation of a ride-sharing vehicle group composed of at least three automated drive vehicles running on a circular route including at least two pick-up and drop-off points.

In the ride-sharing method, the management server is configured to execute interval adjustment processing to adjust a service frequency of the ride-sharing vehicle group based on operating state information of the ride-sharing vehicle group.

In the interval adjustment processing, the management server is configured to;

judge whether or not a vehicle pair composed of two vehicles in a relationship of a preceding vehicle and a following vehicle contain a stopping vehicle as the following vehicle that stops in any one of the at least two pick-up and drop-off points;

when it is judged that the vehicle pair contains the stopping vehicle as the following vehicle, judge whether or not the vehicle pair is a separated pair of which the service frequency exceeds a maximum time;

when it is judged that the vehicle pair corresponds to the separated pair, execute selection processing a selection processing to select from a remaining vehicle group excluding the separated pair from the ride-sharing vehicle group an overtaking vehicle that overtakes the stopping vehicle to cut into the separated pair; and transmit an overtake instruction to the overtaking vehicle selected in the selection processing.

In the selection processing, the management server is configured to:

extract a candidate of the overtaking vehicle from the remaining vehicle group;

judge whether or not a pick-up and/or a drop-off of a user by the candidate is scheduled in a path from an actual position of the candidate to that of the stopping vehicle in the circular route; and when it is judged that the pick-up and/or the drop-off of the user by the candidate is not scheduled, decide the said candidate as the overtaking vehicle.

According to the first or eighth aspect, the interval adjustment processing is executed. In the interval adjustment processing, it is judged whether or not the vehicle pair contain the stopping vehicle as the following vehicle. In the interval adjustment processing, further, it is judged whether or not the vehicle pair corresponds to the separated pair. Then, when it is judged that vehicle pair contains the stopping vehicle as the following vehicle and the vehicle pair corresponds to the separated pair, the selection processing is executed. Then, the overtake instruction is transmitted to the overtaking vehicle selected in the selection processing. The overtaking vehicle is the ride-sharing vehicle that overtakes with the stopping vehicle to cut into between the separated pair. Therefore, according to the interval adjustment processing and the selection processing, it is possible to optimize the service frequency between the preceding vehicle of separated pair and the overtaking vehicle and also the service frequency between the following vehicle of the separated pair and the overtaking vehicle.

Further, in the selection processing, it is judged whether or not the pick-up and/or the drop-off of the user by the candidate is scheduled in the path from the actual position of the candidate to that of the stopping vehicle in the circular route. And when it is judged that the pick-up and/or the drop-off of the user by the candidate is not scheduled, the said candidate is decided as the overtaking vehicle. Therefore, according to the selection processing, it is possible to realize an optimization of the service frequency without sacrificing the pick-up and/or the drop-off of the user in the path from the actual position of the candidate of the overtaking vehicle to the actual position of the stopping vehicle.

According to the second aspect, the candidate is extracted in the ascending order of the time required from respective actual position of the vehicles constituting the remaining vehicle group to the interrupt position. Therefore, as compared with a case where the overtaking vehicle is decided by randomly extracting the candidate of the overtaking vehicle, it is possible to shorten a time until the optimization of the service frequency is completed.

According to the third aspect, when it is judged in the selection processing that the pick-up and/or the drop-off of the user is scheduled in all candidates of the overtaking vehicle, the deceleration driving instruction is transmitted to the remaining vehicle group excluding the separated pair from the ride-sharing vehicle group. The selection processing is executed when the vehicle pair contains the stopping vehicle as the following vehicle and the vehicle pair corresponds to the separated pair. Thus, if the remaining vehicle group is normally operated, the service frequency of the ride-sharing vehicle group may become clogged behind the separated pair. In this respect, according to the third aspect, since the deceleration driving instruction is transmitted to the remaining vehicle group, it is possible to suppress such a reduction in the service frequency.

According to the fourth aspect, in the transmission of the overtake instruction, the acceleration driving instruction is transmitted to the remaining vehicle group of the ride-sharing vehicle group excluding the separated pair, the overtaking vehicle, and a ride-sharing vehicle operated between the overtaking vehicle and the stopping vehicle. When the overtake instruction is transmitted, the service frequency between the preceding vehicle and the following vehicle that had been constituted two vehicle pairs with the overtaking vehicle before the transmission of the overtake instruction, expands. Therefore, if the ride-sharing vehicle group is normally operated during the cut-in by the overtaking vehicle, not only this service frequency but also the service frequency of the ride-sharing vehicle group behind the following vehicle may expand. In this respect, according to the fourth aspect, since the acceleration driving instruction is transmitted in the transmission of the overtake instruction, it is possible to suppress the expansion of the service frequency during the cut-in by the overtaking vehicle.

When the interrupt position is set in the middle of the actual positions of the separated pair in the circular route, the interrupt position moves as the preceding vehicle of the separated pair runs during the cut-in by the overtaking vehicle. In this regard, according to the fifth aspect, the deceleration driving instruction is transmitted to the preceding vehicle of the separated pair. Therefore, as compared with a case where the preceding vehicle of the separated pair is operated normally, it is possible to suppress a travel distance of the preceding vehicle of the separated pair. Therefore, after the overtaking by the overtaking vehicle is completed, it is possible to prevent the service frequency of the separating vehicle and the overtaking vehicle of the separated pair and the service frequency of the following vehicle of the overtaking vehicle and the separated pair from expanding too much.

According to the sixth aspect, when it is judged that vehicle pair does not include the stopping vehicle as the following vehicle and also it is determined that the vehicle pair corresponds to the separated pair, the deceleration driving instruction is transmitted to the preceding vehicle of the separated pair whereas the acceleration driving instruction is transmitted to the following vehicle of the separated pair. Therefore, even when the separated pair does not contain the stopping vehicle as the following vehicle, it is possible to optimize the service frequency of the separated pair.

According to the seventh aspect, when it is judged that the vehicle pair corresponds to the proximity pair, the acceleration driving instruction is transmitted to the preceding vehicle of the proximity pair whereas the deceleration driving instruction is transmitted to the following vehicle of the proximity pair. Therefore, even when the vehicle pair corresponds to the proximity pair, it is possible to optimize the service frequency of the proximity pair.

DESCRIPTION OF EMBODIMENT

Hereinafter, a ride-sharing system and a ride-sharing method according to the embodiment of the present disclosure will be described with reference to the drawings. The ride-sharing method according to the embodiment is realized by computer processing executed in the ride-sharing system according to the embodiment. In each drawing, the same or corresponding parts are given the same sign, and the description thereof is simplified or omitted.

1. Outline of Embodiment 1-1. Ride-Share Service

Figure 1:
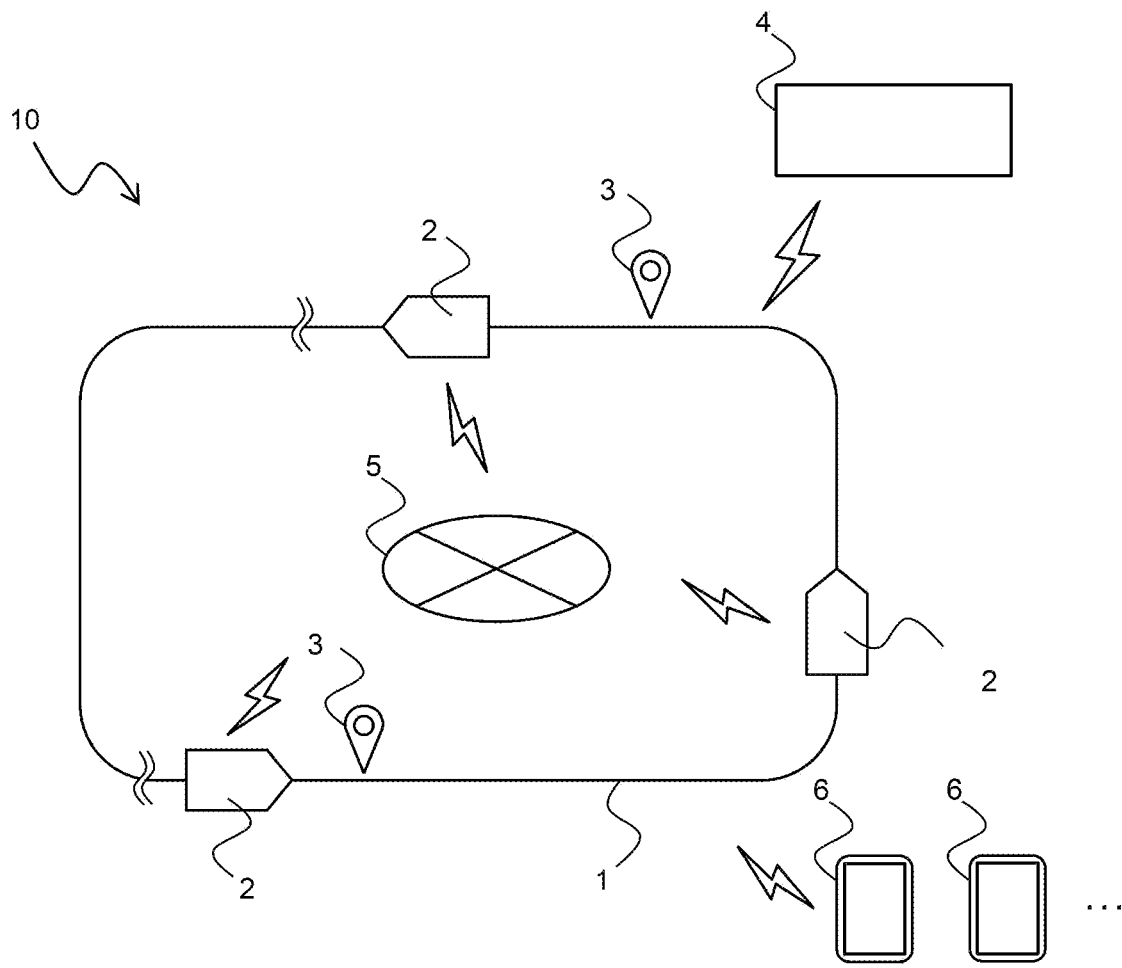
FIG. 1 is a conceptual diagram of a ride-share service.

FIG. 1 is a conceptual diagram of a ride-share service. A circular route 1 shown in FIG. 1 is set within a certain area in which a ride-share service is provided. The circular route 1 is set, for example, by connecting a plurality of roads laid in the certain area. In an example shown in FIG. 1, the circular route 1 is represented by a tether of roads. However, a divergent lane may be provided in a middle of the circular route 1. Examples of the divergent lane include a shortcut that shortcuts a part of the circular route 1 and a detour that detours a part of the circular route 1.

The three ride-sharing vehicles 2 depicted on the circular route 1 constitute a "ride-sharing vehicle group" provided to the ride-share service. Each of the ride-sharing vehicles 2 is composed of an automated drive vehicle capable of performing a driverless driving.

Each of the ride-sharing vehicles 2 runs automatically along the circular route 1 and pauses at a PUDO point 3 on the circular route 1. While the ride-sharing vehicle 2 is paused in the PUDO point 3, a user gets on the said ride-sharing vehicle 2, or a user gets from the said ride-sharing vehicle 2. The ride-sharing vehicle 2 may pass through the PUDO point 3 without pausing at the PUDO point 3.

Although three ride-sharing vehicles 2 are depicted in FIG. 1, a total number of the ride-sharing vehicles 2 may be four or more. Although two PUDO points 3 are depicted in FIG. 1, the total number of the PUDO point 3 may be three or more.

The management server 4 manages an operation of the ride-sharing vehicle group. The management server 4 communicates with the ride-sharing vehicles 2 individually over a network 5. In this communication, the management server 4 receives, for example, an operating state information of the ride-sharing vehicles 2. Examples of the operating state information include velocity information and information on actual locations of the ride-sharing vehicle group. The information on the actual locations is composed of, for example, latitude longitude data. In this communication, the management server 4 transmits, for example, information on a service frequency. The information on the service frequency is information to coordinate the service frequency SF of the ride-sharing vehicle group. Detail of the operation management of the ride-sharing vehicle group by the management server 4 will be described later.

The management server 4 also communicates with a user terminal 6 over the network 5. The user terminal 6 may be a terminal (e.g., a smartphone) carried by a user who desires to use the ride-share service, or a terminal provided in the ride-sharing vehicle 2 (e.g., an on-vehicle tablet terminal). In the communication with the user terminal 6, the management server 4 receives, for example, a PUDO information of the user. Examples of the PUDO information of the user include information of the PUDO point 3 desired by the user, that is, information of at least one of a drop-off point and a pickup point.

For example, the user riding on the ride-sharing vehicle 2 operates the user terminal 6 to transmit the PUDO point 3 information, specifically, the information on the drop-off point, to the management server 4. The user who desires to ride on the ride-sharing vehicle 2 operates the user terminal 6 before getting on the ride-sharing vehicle 2 to transmit the information on the PUDO point 3, specifically, the information on the pickup point, to the management server 4. The information on the pickup point may be information on an actual location of the user. The information on the PUDO point 3 prior to riding may be information on the pickup point and the drop-off point.

The management server 4 transmits a PUDO information on the ride-sharing vehicles 2 to the user terminal 6, for example. The PUDO information on the ride-sharing vehicles 2 is provided to the user terminal 6 that transmits the PUDO information on the said user. Examples of the PUDO information on the ride-sharing vehicles 2 include an estimated arriving time to the PUDO point 3. More specifically, to the user terminal 6 from which the information on the drop-off point is transmitted, the estimated time of the ride-sharing vehicle 2 to arrive at the drop-off point is provided. To the user terminal 6 from which the information on the pickup point is transmitted, the estimated time of the ride-sharing vehicle 2 to arrive the pickup point is provided.

1-2. Operation Management

The operation management by the management server 4 is performed by adjusting the service frequency SF of the ride-sharing vehicle group to a predetermined service frequency PSF. The service frequency SF is calculated, for example, based on time at which each of the ride-sharing vehicles 2 passes any point set between two adjacent points of the PUDO points 3. A calculation of the service frequency SF may be based on time at which each of the ride-sharing vehicles 2 arrives at respective PUDO points. The predetermined service frequency PSF has a constant duration. That is, the predetermined service frequency PSF has a minimum time PLL and a maximum time PUL. "To adjust the service frequency SF to the predetermined service frequency PSF" means "to adjust the the service frequency SF within a range from the minimum time PLL to the maximum time PUL".

Figure 2:
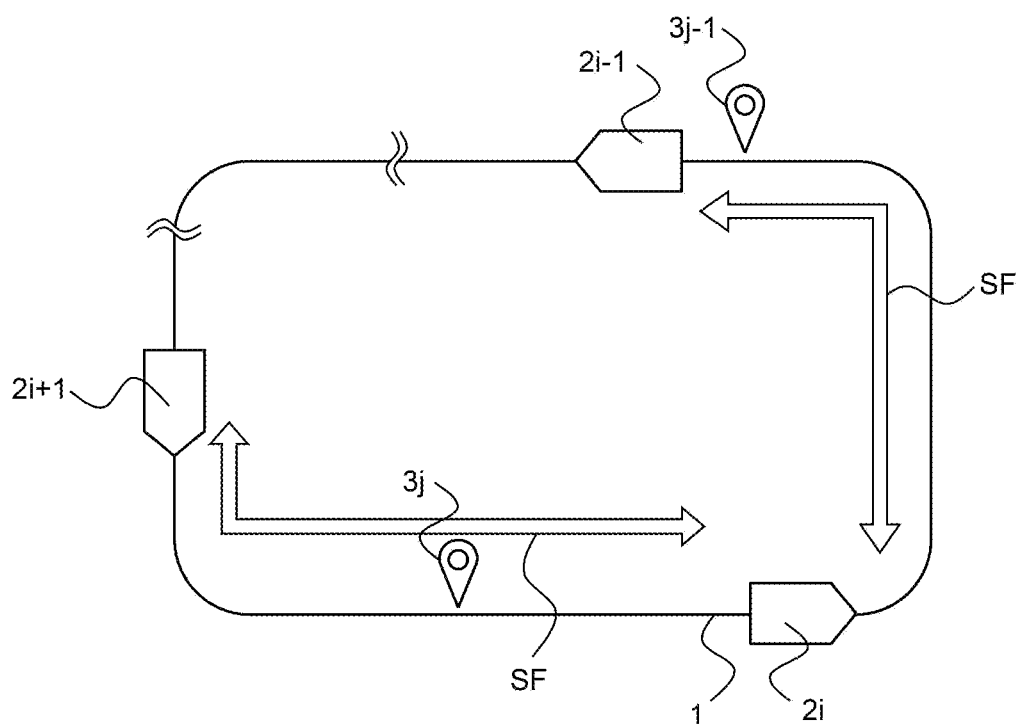
FIG. 2 is a diagram illustrating an example of an operation management performed by a management server.

FIG. 2 is a diagram illustrating an example of the operation management. In FIG. 2, a ride-sharing vehicle $2i-1$, a ride-sharing vehicle $2i$, and a ride-sharing vehicle $2i+1$ are drawn. The ride-sharing vehicle $2i$ is located between a PUDO point $3j-1$ and a PUDO point $3j$. The ride-sharing vehicle $2i$ falls under a following vehicle of the ride-sharing vehicle $2i-1$ and falls under a preceding vehicle of the ride-sharing vehicle $2i+1$. The ride-sharing vehicle $2i-1$ is located in front of the PUDO point $3j-1$. The ride-sharing vehicle $2i-1$ corresponds to the preceding vehicle of the ride-sharing vehicle $2i$. The ride-sharing vehicle $2i+1$ is located behind the PUDO point $3j$. The ride-sharing vehicle $2i+1$ corresponds to the following vehicle of the ride-sharing vehicle $2i$.

In the operation management, it is judged whether or not the service frequency SF of a vehicle pair VP deviates from the predetermined service frequency PSF based on the operating state information on the ride-sharing vehicle group. The vehicle pair VP is composed of two ride-sharing vehicles 2 in a relationship of a preceding vehicle and a following vehicle in the circular route 1. In the embodiment, the vehicle pair VP of which the service frequency SF is below the predetermined service frequency PSF is also referred to as a "proximity pair VPC". The vehicle pair VP of which the service frequency SF exceeds the predetermined service frequency PSF is also referred to as a "separated pair VPS".

For example, it is assumed that the service frequency SF of the vehicle pair VP composed of the ride-sharing vehicle $2i-1$ and the ride-sharing vehicle $2i$ is below the predetermined service frequency PSF. In this instance, the ride-sharing vehicles $2i-1$ and $2i$ constitute the proximity pair VPC. Now, consider a case where the service frequency SF of the vehicle pair VP composed of the ride-sharing vehicles $2i$ and $2i-1$ exceeds the predetermined service frequency PSF. In this instance, the ride-sharing vehicles $2i$ and $2i-1$ constitute the separated pair VPS.

In the operation management, an acceleration driving instruction is transmitted to the preceding vehicle of the proximity pair VPC and a deceleration driving instruction is sent for the following vehicle of the said proximity pair VPC. On the other hand, the deceleration driving instruction is transmitted to the preceding vehicle of the separated pair VPS and the acceleration driving instruction is transmitted to the following vehicle of the said separated pair VPS.

The acceleration driving instruction and the deceleration driving instruction are included in the information on the service frequency transmitted from the management server 4 to the ride-sharing vehicles 2. An upper limit tolerance of driving speed is set in each of the ride-sharing vehicles 2. The acceleration driving instruction includes an instruction to change this upper limit tolerance to a high-speed value. The deceleration driving instruction includes an instruction to change this upper limit tolerance to a slow speed value.

For example, consider a case where the ride-sharing vehicles $2i-1$ and $2i$ constitute the proximity pair VPC. In this instance, the acceleration driving instruction is transmitted to the preceding vehicle (i.e., the ride-sharing vehicle $2i-1$) of the proximity pair VPC, and the deceleration driving instruction is transmitted to the following vehicle (i.e., the ride-sharing vehicle $2i$) of the proximity pair. Then, consider another case where the ride-sharing vehicles $2i$ and $2i+1$ constitute the separated pair VPS. In this instance, the deceleration driving instruction is transmitted to the preceding vehicle (i.e., the ride-sharing vehicle $2i$) of the separated pair VPS, and the acceleration driving instruction is transmitted to the following vehicle (i.e., the ride-sharing vehicle $2i+1$) of the separated pair VPS.

1-3. Features of Operation Management

When the two vehicles constituting the proximity pair VPC (or the separated pair VPS) are running, the service frequency SF of the proximity pair VPC (or the separated pair VPS) should be optimized as time passes by the acceleration or deceleration driving instruction to these vehicles. However, when the preceding vehicle constituting the proximity pair VPC is stopped, it is assumed that it takes a long time to obtain this optimization effect. The same is assumed when the following vehicle constituting the separated pair VPS is stopped.

In the ride-share service, since the PUDO action of the user is performed any PUDO point 3, the ride-sharing vehicle 2 stops at any PUDO point 3. Therefore, if the stop time at the PUDO point 3 of the preceding vehicle constituting the proximity pair VPC becomes longer, the service frequency SF between the preceding following vehicles becomes clogged as time passes. If the stop time at the PUDO point 3 of the following vehicle constituting the separated pair VPS becomes longer, the service frequency SF between the following and preceding vehicles increases as time passes.

Figure 3:
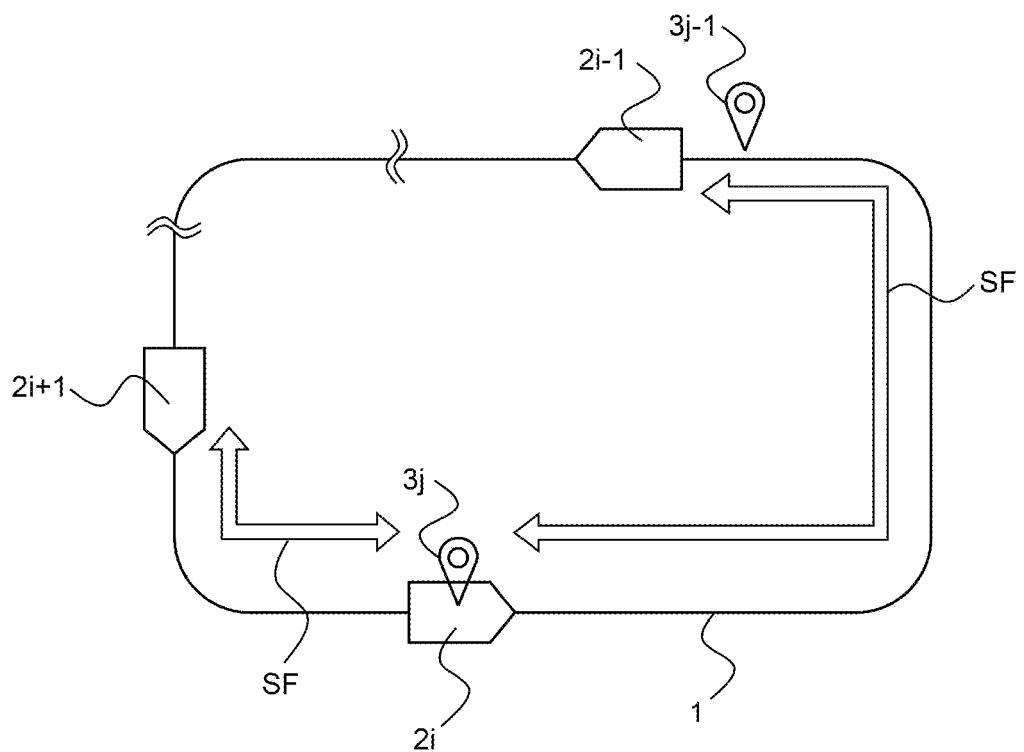
FIG. 3 is a diagram illustrating problems in the ride-share service.

FIG. 3 is a diagram illustrating these problems. In the example shown in FIG. 3, the ride-sharing vehicle $2i$ stops at the PUDO point $3j$. Except for this point, it is the same as the example shown in FIG. 2. In the example shown in FIG. 3, it is assumed that the ride-sharing vehicle $2i$ stops at the PUDO point $3j$ for a long period of time. Then, in spite of the acceleration or deceleration driving instruction, the service frequency SF between the ride-sharing vehicles $2i-1$ and $2i$ does not shrink, and the service frequency SF between the ride-sharing vehicles $2i$ and $2i+1$ does not expand. That is, a separated state between the ride-sharing vehicles $2i-1$ and $2i$ is not solved, and a proximity state between the ride-sharing vehicles $2i$ and $2i+1$ is not solved.

In order to cope with such problems, the embodiment focuses on the following vehicle constituting the vehicle pair VP. Specifically, the management server 4 judges whether or not the following vehicle constituting the vehicle pair VP corresponds to a vehicle stopped at the PUDO point 3 (hereinafter, also referred to as a "stopping vehicle"). The management server 4 also, in response to this judgement result, switches an adjustment method of the service frequency SF of the ride-sharing vehicle group between a first and a second adjustment method. The first adjustment method is applied when it is judged that the following vehicle constituting the vehicle pair VP does not correspond to the stopping vehicle. The first adjustment method is performed according to the operation management method described above.

The second adjustment method is applied when it is judged that the following vehicle constituting the vehicle pair VP corresponds to the stopping vehicle. In the second adjustment method, the management server 4 further judges whether the vehicle pair VP corresponds to the separated pair VPS. When it is determined that the vehicle pair VP corresponds to the separated pair VPS, an overtaking vehicle $2i+x$ is selected from the ride-sharing vehicle group excluding the separated pair VPS. The selection of the overtaking vehicle $2i+x$ is not performed when it is judged that the vehicle pair VP does not correspond to the separated pair VPS.

Figure 4:
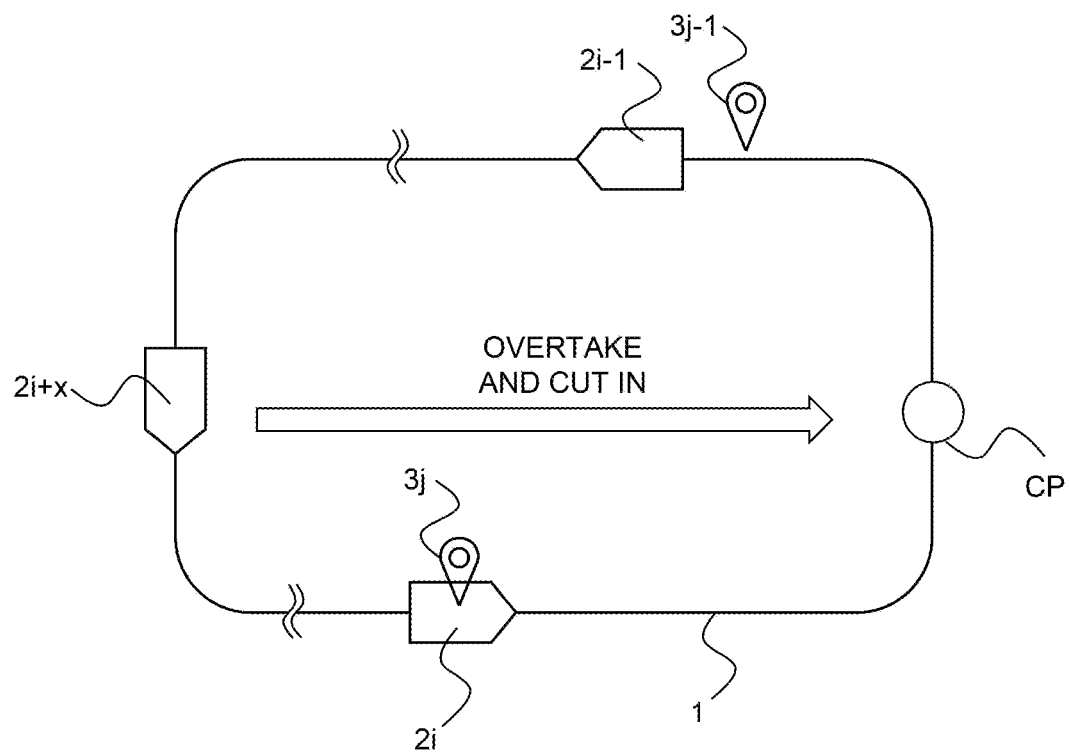
FIG. 4 is a diagram illustrating a second adjustment method.

FIG. 4 is a diagram illustrating the second adjustment method. The overtaking vehicle $2i+x$ is drawn in FIG. 4. The overtaking vehicle $2i+x$ is the ride-sharing vehicle 2 that overtakes with the following vehicle (i.e., the ride-sharing vehicle $2i$ of the separated pair VPS) and cuts into between the separated pair VPS. An interrupt position CP of the overtaking vehicle $2i+x$ is set, for example, in a middle of the actual positions of the separated pair VPS. This intermediate position is calculated, for example, on the basis of information on the actual locations of separated pair VPS.

The overtaking vehicle $2i+x$ may be the ride-sharing vehicle $2i+1$ shown in FIGS. 2 and 3, or may be the ride-sharing vehicle 2 other than the ride-sharing vehicle $2i+1$. However, since the overtaking vehicle $2i+x$ is selected from the remaining ride-sharing vehicle group except for the separated pair VPS, the ride-sharing vehicle $2i-1$ or $2i$ does not selected as the overtaking vehicle $2i+x$.

In addition, as the overtaking vehicle $2i+x$, the ride-sharing vehicle 2 in which the pick-up and/or the drop-off of the user is not scheduled in the path from the actual position of the overtaking vehicle $2i+x$ to the actual position (i.e., the PUDO point $3j$) of the following vehicle (the ride-sharing vehicle $2i$) composed of the separated pair VPS is selected. For example, the ride-sharing vehicle 2 on which the user who wants to get off at the PUDO point $3j$ is riding is not selected as the overtaking vehicle $2i+x$. Note that a schedule of the PUDO action of the user is grabbed based on the PUDO information of the user.

When the overtaking vehicle $2i+x$ cuts into between the separated pair VPS, the preceding vehicle of the separated pair VPS and the overtaking vehicle $2i+x$ constitute a new vehicle pair VP. Further, the following vehicle of the separated pair VPS and the overtaking vehicle $2i+x$ constitutes a new vehicle pair VP. Furthermore, the preceding vehicle (i.e., the ride-sharing vehicle $2i+x-1$) that constituted the vehicle pair with the overtaking vehicle $2i+x$ prior to the selection of the overtaking vehicle $2i+x$ constitutes a new vehicle pair VP with the following vehicle (i.e., the ride-sharing vehicle $2i+x+1$) that constituted another vehicle pair VP with the overtaking vehicle $2i+x$.

As described above, according to the embodiment, when the following vehicle constituting the vehicle pair VP does not correspond to the stopping vehicle, the first adjustment method is applied. According to the first adjustment method, the acceleration driving instruction is transmitted to the preceding vehicle of the proximity pair VPC and the deceleration driving instruction is transmitted to the following vehicle of the proximity pair VPC. On the other hand, the deceleration driving instruction is transmitted to the preceding vehicle of the separated pair VPS and the acceleration driving instruction is transmitted to the following vehicle of the said separated pair VPS. Therefore, it is possible to optimize the service frequency SF of the ride-sharing vehicle group as time passes.

In addition, according to the embodiment, when the following vehicle constituting the vehicle pair VP corresponds to the stopping vehicle, the second adjustment method is applied. According to the second adjustment method, when the following vehicle of the separated pair VPS corresponds to the stopping vehicle, the overtaking vehicle $2i+x$ is selected. Thus, the service frequency SF between the preceding vehicle of the separated pair VPS and the overtaking vehicle $2i+x$ and that between the overtaking vehicle $2i+x$ and the following vehicle of the separated pair VPS can be optimized. Therefore, it is possible to optimize the service frequency SF of the ride-sharing vehicle group as time passes. This optimization effect can be obtained even when PUDO action of the user by following vehicle of separated pair VPS takes a long time.

Hereinafter, the ride-sharing system according and ride-sharing method according to the embodiment will be described in detail.

2. Ride-Sharing System 2-1. Main Configuration Example

Figure 5:
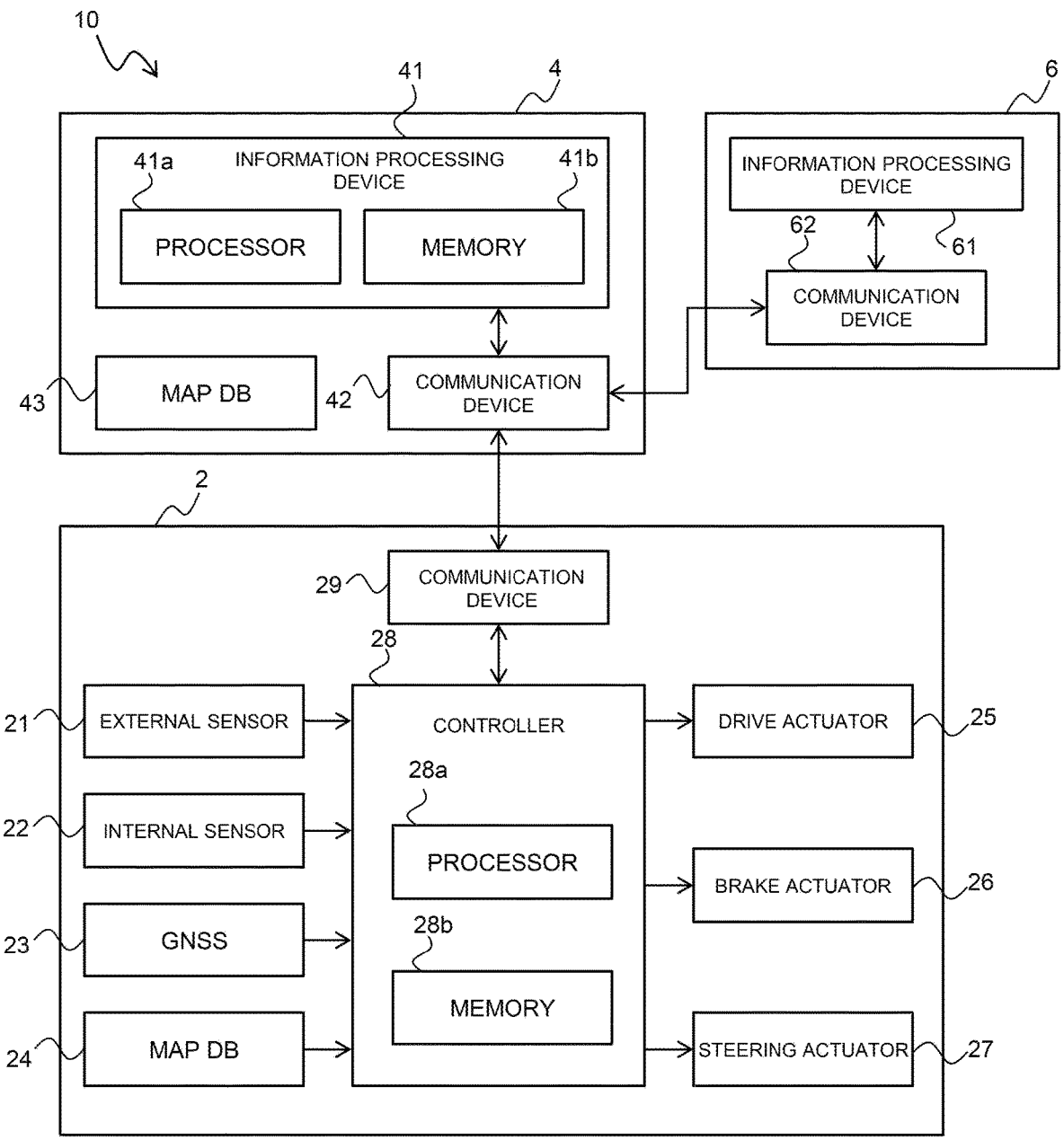
FIG. 5 is a block diagram showing a main configuration example of a ride-sharing system.

FIG. 5 is a diagram showing a main configuration example of the ride-sharing system according to the embodiment. As shown in FIG. 5, a ride-sharing system 10 includes a ride-sharing vehicle 2, a management server 4, and a user terminal 6. The communication between the ride-sharing vehicle 2 and the management server 4 takes place via the network 5 as described in FIG. 1. The communication between the user terminal 6 and the management server 4 is also described in FIG. 1.

The ride-sharing vehicle 2 is a passenger vehicle that transports the user and the user's baggage in response to a request from the user. The ride-sharing vehicle 2 is, for example, a vehicle in which an internal combustion engine such as a diesel engine or a gasoline engine is used as a power source, an electronic vehicle in which an electric motor is used as the power source, or a hybrid vehicle including the internal combustion engine and the electric motor. The electric motor is driven by a battery such as a secondary cell, a hydrogen cell, a metallic fuel cell, and an alcohol fuel cell.

As shown in FIG. 5, the ride-sharing vehicle 2 includes an external sensor 21, an internal sensor 22, a GNSS (Global Navigation Satellite System) receiver 23, and a map database 24. The ride-sharing vehicle 2 also includes a drive actuator 25, a braking actuator 26, and a steering actuator 27. The ride-sharing vehicle 2 also includes a controller 28 and a communication device 29.

The external sensor 21 is a device that detects a situation around the ride-sharing vehicle 2. Examples of the external sensor 21 include a radar sensor and a camera. The radar sensor uses radio waves (e.g., millimeter wave) or lights to detect an object around the ride-sharing vehicle 2. The object includes a static body and a moving body. Examples of the static body include a guard rail and a building. The moving body includes a walker, a bicycle, a motorcycle, and a vehicle other than the ride-sharing vehicle 2. The camera captures an external situation of the ride-sharing vehicle 2. The external sensor 21 transmits the information on these surrounding situations to the controller 28.

The internal sensor 22 is a device that detects a driving state of the ride-sharing vehicle 2. Examples of the internal sensor 22 include a vehicle speed sensor, an acceleration sensor, and a yaw rate sensor. The vehicle speed sensor detects driving speed of the ride-sharing vehicle 2. The acceleration sensor detects acceleration of the ride-sharing vehicle 2. The yaw rate sensor detects yaw rate around a vertical axis of a center of gravity of the ride-sharing vehicle 2. The internal sensor 22 transmits information on the driving state to the controller 28.

The GNSS receiver 23 is a device to receive signals from three or more artificial satellites. The GNSS receiver 23 is also a device to acquire information on a position of the ride-sharing vehicle 2. The GNSS receiver 23 calculates a position (an orientation) and posture of the ride-sharing vehicle 2 based on the received signal. The GNSS receiver 23 transmits information on GNSS to the controller 28.

The map database 24 is a data base that stores map information. Examples of the map information include positional information of roads, information on a road (e.g., curves, types of straight lines) and information on intersections and constructions. The map information also includes information on traffic regulations. The map database 24 is formed in a memory device provided on a vehicle (e.g., a hard disk, a flash memory). The map database 24 may be formed in a facility computer capable of communicating with the ride-sharing vehicle 2. The facility computer may be a computer of the management server 4. That is, the management server 4 and the ride-sharing vehicle 2 may share the map database.

The controller 28 is a microcomputer having at least one processor 28a and at least one memory 28b. At least one program is stored in the memory 28b. The program stored in the memory 28b is read and executed by the processor 28a to realize various functions of the controller 28. Examples of this function include a function to process the information on the surrounding situation from the external sensor 21 and that on the driving state from the internal sensor 22.

The controller 28 executes automated driving control of the ride-sharing vehicle 2 based on an operating signal obtained by processing of the information on the surrounding situation from the external sensor 21, that on the driving state from the internal sensor 22, and the like. In the automated driving control, at least one vehicle actuator of a drive actuator 25, a braking actuator 26 and a steering actuator 27 is controlled. The drive actuator 25 is a vehicle actuator that drives the ride-sharing vehicle 2. The braking actuator 26 is a vehicle actuator that imparts a braking force to the ride-sharing vehicle 2. The steering actuator 27 is a vehicle actuator that steers wheels of the ride-sharing vehicle 2.

The communication device 29 performs wireless communication with a base station (not shown) of the network 5. Examples of this wireless communication include mobile communication standards such as 4G, LTE, and 5G. A connection point of the communication device 29 includes the management server 4. For example, identification information and the operating state information (e.g., velocity information and information on the actual location) of the ride-sharing vehicle 2 are transmitted from the communication device 29 to the management server 4. The information on the surrounding situation from the external sensor 21 may be transmitted from the communication device 29 to the management server 4.

The management server 4 includes an information processing device 41, a communication device 42, and a map database 43.

The information processing device 41 includes a computer having at least one processor 41a and at least one memory 41b. At least one program is stored in the memory 41b. Various functions of the information processing device 41 are realized when various programs stored in the memory 41b are read out and then executed by the processor 41a. This function also includes the function of the operation management described above. Various kinds of information acquired by the communication with the ride-sharing vehicle 2 are also stored in the memory 41b. Various kinds of information acquired by the communication with user terminal 6 are also stored in the memory 41b.

The communication device 42 performs a wireless communicate with the base station of the network 5. Examples of this wireless communication include mobile communication standards such as 4G, LTE, and 5G. The connection points of the communication device 42 includes the ride-sharing vehicle 2 and the user terminal 6. For example, the information on the service frequency is transmitted from the communication device 42 to the ride-sharing vehicles 2. The communication device 42 transmits the PUDO information of the ride-sharing vehicle 2 to the user terminal 6, for example.

The map database 43 is a data base that stores map information. Examples of the map information include the same information as that stored in the map database 24. The map database 43 is formed in a predetermined memory device (e.g., a hard disk, a flash memory).

The user terminal 6 includes an information processing device 61 and a communication device 62.

The information processing device 61 includes a microcomputer having at least one processor and at least one memory. At least one program is stored in the memory. Various functions of the information processing device 61 are realized when various programs stored in the memory are read out and then executed by the processor.

The communication device 62 performs a wireless communicate with the base station of the network 5. Examples of this wireless communication include mobile communication standards such as 4G, LTE, and 5G. A connection point of the communication device 62 includes the management server 4. For example, identification information of the user and the PUDO information of the said user are transmitted from the communication device 62 to the management server 4.

2-2. Interval Adjustment Processing

Figure 6:
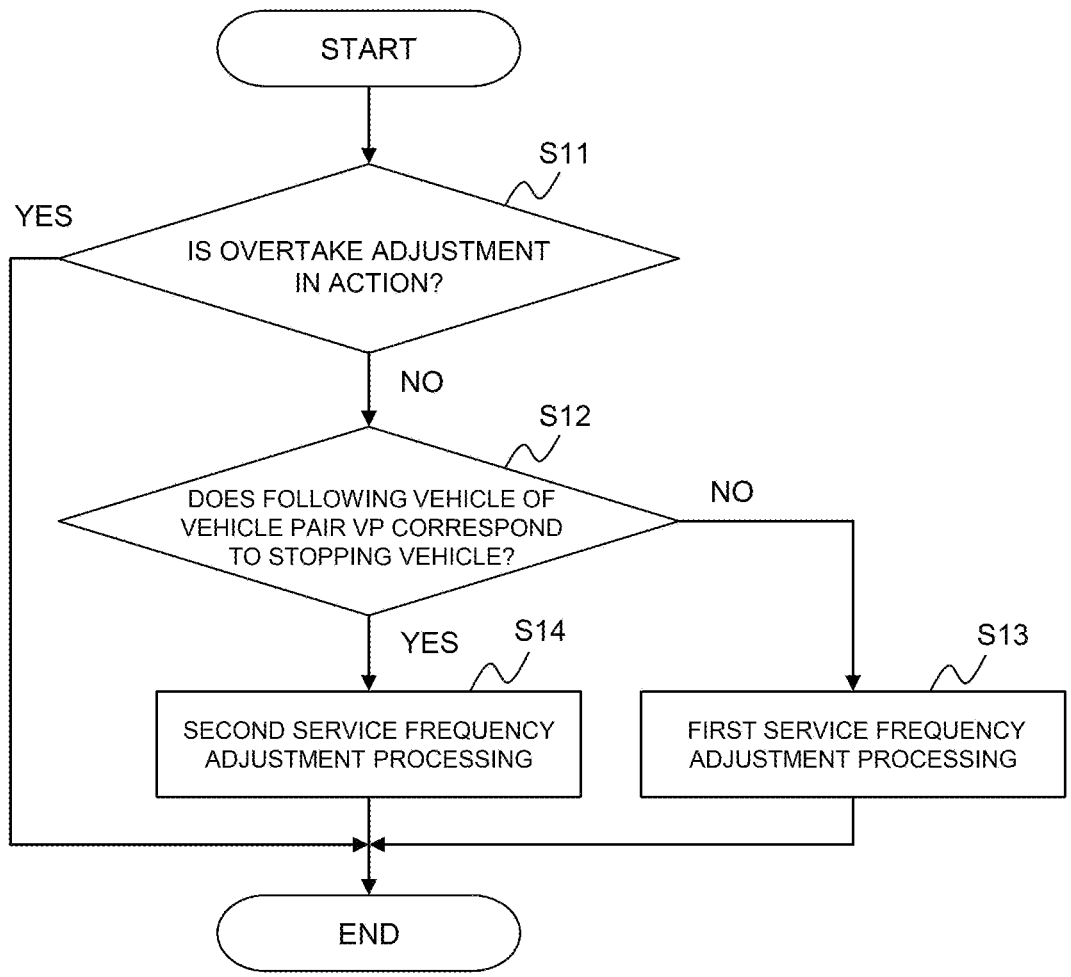
FIG. 6 is a flowchart showing a basic flow of interval adjustment processing.

The information processing device 41 (the processor 41a) executes "interval adjustment processing" as processing to adjust the service frequency SF of the ride-sharing vehicle group to the predetermined service frequency PSF. FIG. 6 is a flowchart showing a basic flow of the interval adjustment processing. The routines shown in FIG. 6 is repeatedly executed at a predetermined process interval.

In the routine shown in FIG. 6, first, it is judged whether or not an overtake adjustment is in action (step S11). The overtake adjustment will be described in detail in FIG. 8. If the judgement result in the step S11 is positive, the interval adjustment processing is ended.

If the judgement result in the step S11 is negative, it is judged whether or not the following vehicle of the vehicle pair VP corresponds to the stopping vehicle (step S12). An identification of the vehicle pair VP is performed by combining two ride-sharing vehicles 2 in a relation of the preceding and following vehicles based on the operating state information of the ride-sharing vehicle group (e.g., the information on the actual location). The processing of the step S12 is executed for all ride-sharing vehicles 2 constituting the ride-sharing vehicle group.

If the judgement result in the step S12 is negative, first service frequency adjustment processing is executed (step S13). On the other hand, if the judgement result in the step S12 is positive, second service frequency adjustment processing is executed (step S14).

Hereinafter, the first and second service frequency adjustment processing will be described in detail.

2-2-1. First Service Frequency Adjustment Processing

Figure 7:
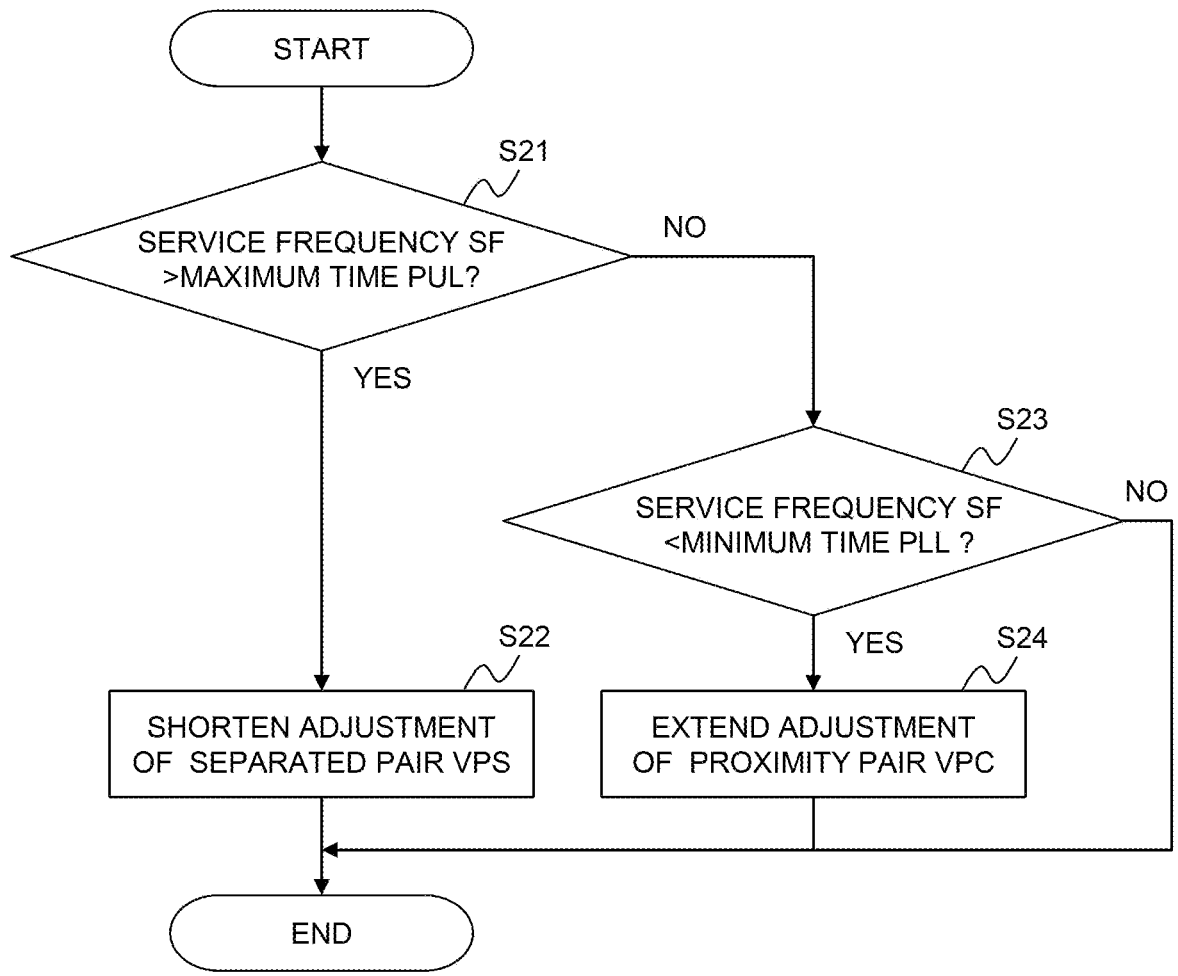
FIG. 7 is a flowchart showing a flow of first service frequency adjustment processing.

The first service frequency adjustment processing is processing to realize the first adjustment method described above. FIG. 7 is a flowchart showing a flow of the first service frequency adjustment processing. The routine shown in FIG. 7 is executed as the processing of the step S13 shown in FIG. 6.

In the routine shown in FIG. 7, it is first judged whether or not the service frequency SF of the vehicle pair VP exceeds a maximum time PUL (step S21). An object of the vehicle pair VP to be processed in the step S21 is that to be processed in the step S12 of FIG. 6. The service frequency SF of the vehicle pair VP is calculated based on a history of the information on the operating state (i.e., the information on the actual location) of the ride-sharing vehicle group. The service frequency SF of the vehicle pair VP is, for example, a difference between a time at which the preceding vehicle passes an arbitrary point set between two adjacent PUDO points 3 and the time at which the following vehicle passes this arbitrary point.

If the judgement result in the step S21 is positive, it is determined that vehicle pair VP corresponds to the separated pair VPS. Therefore, in this case, a shorten adjustment of the separated pair VPS is performed (step S22). In the shorten adjustment, the deceleration driving instruction is transmitted to the preceding vehicle of the separated pair VPS and the acceleration driving instruction is transmitted to the following vehicle of the separated pair VPS.

As described above, the upper limit tolerance of driving speed is set in each of the ride-sharing vehicles 2. The acceleration driving instruction includes a command to change the upper limit tolerance of the following vehicle of the separated pair VPS to the high-speed value. The deceleration driving instruction includes a command to change the upper limit tolerance of the preceding vehicle of the separated pair VPS to the low-speed value. By executing the processing of the step S22, the service frequency SF of the separated pair VPS is optimized as time passes.

If the judgement result in the step S21 is negative, it is judged whether or not the service frequency SF of the vehicle pair VP is lower than the minimum time PLL (step S23). The object of the vehicle pair VP to be processed in the step S23 is that to be processed in the step S21. If the judgement result in the step S23 is negative, it is determined that the service frequency SF of the vehicle pair VP is kept the predetermined service frequency PSF. Therefore, in this case, the first service frequency adjustment processing is ended.

If the judgement result in the step S23 is positive, it is determined that the vehicle pair VP corresponds to the proximity pair VPC. Therefore, the extend adjustment of the proximity pair VPC is executed (step S24). In the extend adjustment, the acceleration driving instruction is transmitted to the preceding vehicle of the proximity pair VPC and the deceleration driving instruction is transmitted to the following vehicle of the proximity pair VPC. By executing the processing of the step S24, the service frequency SF of the proximity pair VPC is optimized as time passes.

2-2-2. Second Service Frequency Adjustment Processing

Figure 8:
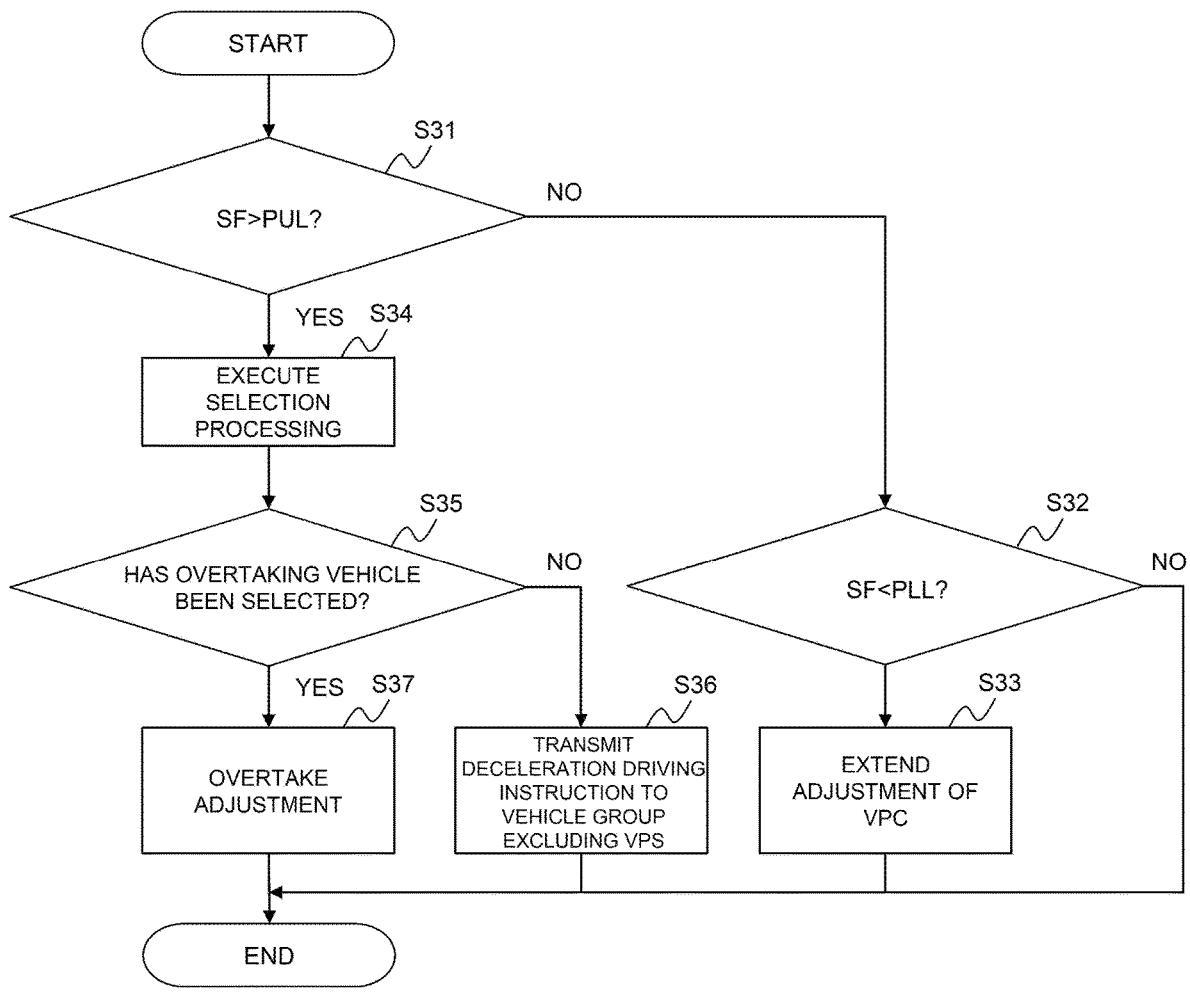
FIG. 8 is a flowchart showing a flow of second service frequency adjustment processing.

The second service frequency adjustment processing is processing to realize the second adjustment method described above. FIG. 8 is a flowchart showing a flow of the second service frequency adjustment processing. The routine shown in FIG. 8 is executed as the processing of the step S14 shown in FIG. 6.

In the routine shown in FIG. 8, first, it is judged whether or not the service frequency SF of the vehicle pair VP exceeds the maximum time PUL value (step S31). The content of the processing of the step S31 is the same as that of the step S21 described in FIG. 7.

If the judgement result in the step S31 is negative, it is judged whether or not service frequency SF of vehicle pair VP is lower than minimum time PLL (step S32). Then, if the judgement result in the step S32 is positive, the extend adjustment of the proximity pair VPC is executed (step S33). The content of the processing in the steps S32 and S33 is the same as that of the processing in the steps S23 and S24 described in FIG. 7.

If the judgement result in the step S31 is positive, the selection processing is executed (step S34). If the judgement result in the step S31 is positive, it is determined that the vehicle pair VP corresponds to the separated pair VPS. In addition, the second service frequency adjustment processing is executed when the following vehicle of the vehicle pair VP corresponds to the stopping vehicle (see FIG. 6, step S12). Therefore, the processing of the step S34 is executed when the following vehicle of the separated pair VPS corresponds to the stopping vehicle. In the selection processing, the ride-sharing vehicle 2 that overtakes this following vehicle and cuts into between the separated pair VPS is determined. Details of the selection processing will be described later.

Subsequent to the processing of the step S34, it is judged whether or not the overtaking vehicle has been selected (step S35). In the selection processing described later, the overtaking vehicle is selected. The overtaking vehicle is selected if a predetermined PUDO condition for a candidate 2C of the overtaking vehicle is satisfied. In other words, if the predetermined PUDO condition is not satisfied, the overtaking vehicle is not selected. In such a case, a negative judgement result is obtained in the processing of the step S35.

If the judgement result in the step S35 is negative, the deceleration driving instruction is transmitted to a remaining ride-sharing vehicle group excluding the separated pair VPS (step S36). As described above, the deceleration driving instruction includes the command to change the upper limit tolerance of each ride-sharing vehicles 2 to the low-speed value. By executing the step S36, the upper limit tolerance of the ride-sharing vehicle 2 included in the ride-sharing vehicle group is lowered. Therefore, as compared to a case where the upper limit tolerance is not lowered, it is possible to prevent the service frequency SF of the ride-sharing vehicle group from being clogged behind the separated pair VPS.

If the judgement result in the step S35 is positive, the overtake adjustment is executed (step S37). In the overtake adjustment, an overtake instruction is transmitted to the overtaking vehicle. The overtake instruction includes a command to change the upper limit tolerance of the overtaking vehicle to the high-speed value. The overtake instruction also includes information on an interrupt position CP of the overtaking vehicle. This interrupt position CP is set, for example, in the middle of the actual positions of the separated pair VPS in the circular route 1. This intermediate position is calculated, for example, on the basis of the information on the actual locations of the separated pair VPS.

In the overtake adjustment, the acceleration driving instruction is transmitted to the remaining ride-sharing vehicle group excluding the separated pair VPS, the overtaking vehicle, and the preceding vehicle that constituted the vehicle pair with the overtaking vehicle. As described above, the acceleration driving instruction includes the command to change the upper limit tolerance of each ride-sharing vehicles 2 to the high-speed value. Therefore, when the acceleration driving instruction is transmitted, the upper limit tolerance of the ride-sharing vehicles 2 included in ride-sharing vehicle group is increased. Therefore, as compared with a case where the upper limit tolerance is not increased, it is possible to prevent the service frequency SF of the preceding and following vehicles that had constituted the vehicle pair with the overtaking vehicle from being expanding. Also, it is possible to prevent the service frequency SF of the ride-sharing vehicle group behind the said following vehicle from being expanding.

In the overtake adjustment, the deceleration driving instruction is also transmitted to the preceding vehicle of the separated pair VPS. When the interrupt position CP is set in the middle of the actual positions of the separated pair VPS, this interrupt position CP moves as the preceding vehicle composed of the separated pair VPS travels. In this respect, if the deceleration driving instruction is transmitted to the preceding vehicle of the separated pair VPS, the upper limit tolerance of the preceding vehicle is lowered. Therefore, as compared with a case where the upper limit tolerance of the preceding vehicle of the separated pair VPS is set to a default value, it is possible to suppress a moving amount of the interrupt position CP while the overtaking vehicle moves toward the interrupt position CP. Therefore, after the overtake adjustment is completed, it is possible to prevent the service frequency SF of the preceding and following vehicles that had constituted two vehicle pairs with the overtaking vehicle from being expanding. Also, it is possible to prevent the service frequency SF of the overtaking vehicle and the following vehicle of the separated pair VPS from being expanding too mach.

2-3. Selection Processing

Figure 9:
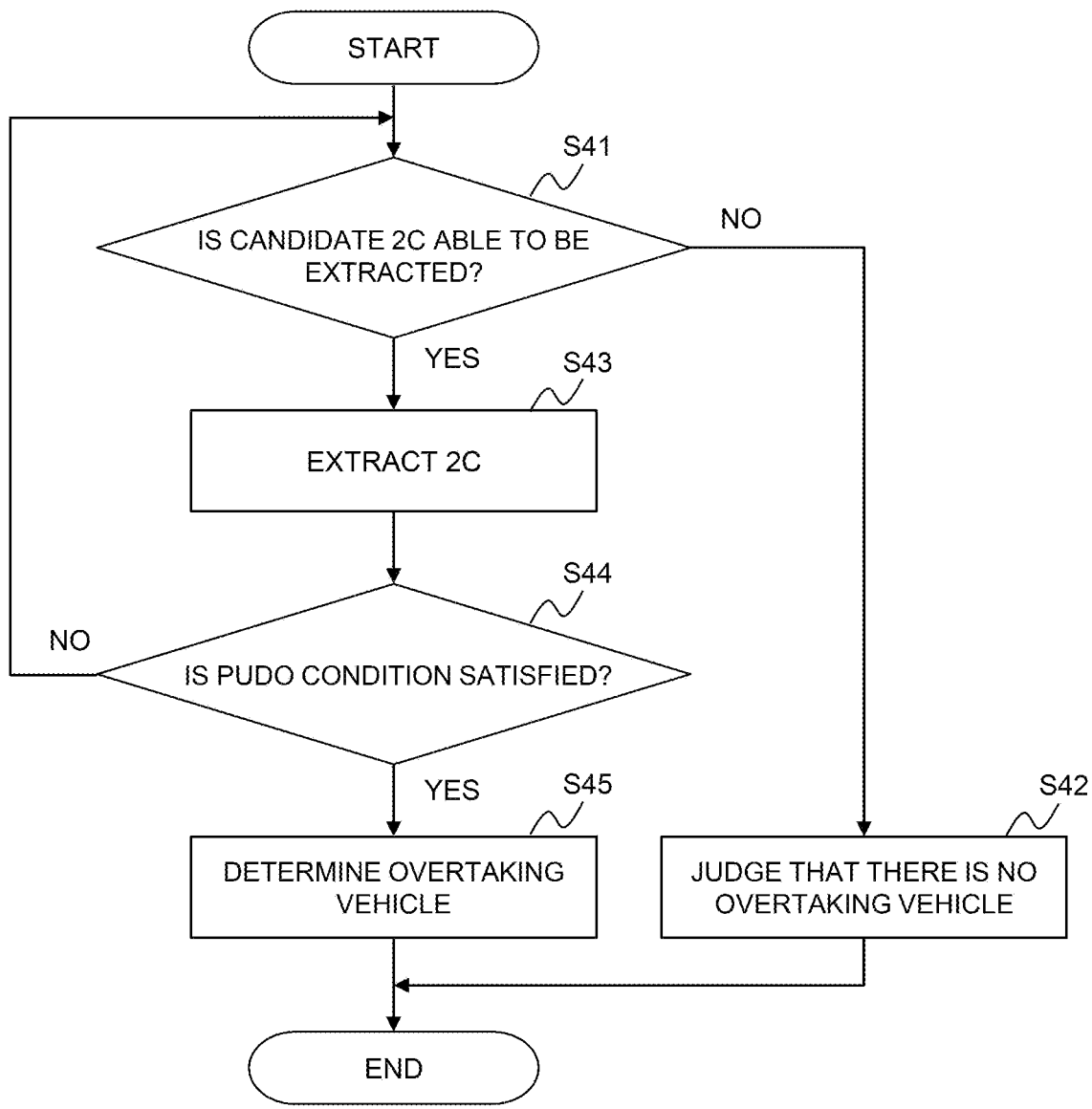
FIG. 9 is a flowchart showing a flow of selection processing.

FIG. 9 is a flowchart showing a flow of the selection processing. The routine shown in FIG. 9 is executed as the processing of the step S34 shown in FIG. 8.

In the routine shown in FIG. 9, first, it is judged whether or not a candidate 2C of the overtaking vehicle can be extracted (step S41). The candidate 2C is extracted from the remaining ride-sharing vehicle group excluding the separated pair VPS. In this extracting, for example, it is judged whether or not a predetermined PUDO condition described later is satisfied for the candidate 2C prioritized according to a predetermined rule. The processing of the step S41 is repeatedly executed until it is judged that predetermined PUDO condition is satisfied in any candidate 2C.

When it is judged in the processing of the step S41 that the predetermined PUDO condition is not satisfied in all candidate 2C, it is judged that the candidate 2C cannot be extracted. In this case, it is judged that there is no overtaking vehicle (step S42). Otherwise, the processing in the step S43 is executed.

In the processing of the step S43, the candidate 2C is extracted. In this extraction, respective time required from respective actual position of the ride-sharing vehicles 2 to the interrupt position CP is calculated based on the operating state information of the ride-sharing vehicle group. The ride-sharing vehicles 2 constituting the separated pair VPS and the ride-sharing vehicle 2 in which the judgment of the predetermined PUDO condition described later has been performed are not subject to the calculation of the required time. The candidate 2C is extracted in an order from the ride-sharing vehicle 2 having a shorter required time. By extracting the candidate 2C in accordance with such a rule, it is possible to shorten the time until the optimization of the service frequency SF of the ride-sharing vehicle group is completed, as compared with a case where the candidate 2C is randomly extracted and the overtaking vehicle is determined.

Subsequent to the step S43, it is judged whether or not the predetermined PUDO condition is satisfied (step S44). The judgement target in the step S44 is the candidate 2C extracted in the step S43. The predetermined PUDO condition includes that the pick-up and/or the drop-off of the user by the candidate 2C in the path from the actual position of the candidate 2C to the actual position (i.e., the PUDO point 3) of the ride-sharing vehicle 2 composed of the separated pair VPS.

As mentioned earlier, the user terminal 6 provides the management server 4 with the PUDO point 3 at which the user desires to use. Whether or not the predetermined PUDO condition is satisfied is judged based on the information on this PUDO point 3. If the judgement result in the step S44 is negative, the processing of the step S41 is executed.

If the judgement result in the step S44 is positive, the overtaking vehicle is determined (step S45). The candidate 2C determined as the overtaking vehicle is the one judged in the step S43 that the predicted PUDO condition is satisfied.

3. Effect

According to the embodiment described above, when the following vehicle constituting the vehicle pair VP does not correspond to the stopping vehicle, the first service frequency adjustment processing is performed. According to the first service frequency adjustment processing, the acceleration driving instruction is transmitted to the preceding vehicle of the proximity pair VPC and the deceleration driving instruction is transmitted to the following vehicle of the proximity pair VPC. On the other hand, the deceleration driving instruction is transmitted to the preceding vehicle of the separated pair VPS and the acceleration driving instruction is transmitted to the following vehicle of the said separated pair VPS. Therefore, it is possible to optimize the service frequency SF of the ride-sharing vehicle group as time passes.

In addition, according to the embodiment, when the following vehicle constituting the vehicle pair VP corresponds to the stopping vehicle, the second service frequency adjustment processing is performed. According to this second service frequency adjustment processing, when the following vehicle of the separated pair VPS corresponds to the stopping vehicle, the selection processing of the overtaking vehicle is executed. When the overtaking vehicle is selected, the service frequency SF of the preceding vehicle of the separated pair VPS and the overtaking vehicle and the service frequency SF of the following vehicle of the separated pair VPS and the overtaking vehicle can be optimized. Therefore, it is possible to optimize the service frequency SF of the ride-sharing vehicle group as time passes. This optimization effect can be obtained even when PUDO action of the user by following vehicle of separated pair VPS takes a long time.

What is claimed is:

1. A ride-sharing system for providing a ride-share service; comprising:
   a ride-sharing vehicle group composed of at least three automated drive vehicles running on a circular route including at least two pick-up and drop-off points; and
   a management server configured to manage an operation of the ride-sharing vehicle group,
   wherein the management server configured to execute interval adjustment processing to adjust a service frequency of the ride-sharing vehicle group based on operating state information of the ride-sharing vehicle group,
     wherein, in the interval adjustment processing, the management server configured to:
     judge whether or not a vehicle pair composed of two vehicles in a relationship of a preceding vehicle and a following vehicle contain a stopping vehicle as the following vehicle that stops in any one of the at least two pick-up and drop-off points;
     judge whether or not the vehicle pair fall under a separated pair;
     when the service frequency of the vehicle pair exceeds a maximum time, determine that the vehicle pair falls under the separated pair;
     when it is judge that the vehicle pair includes the stopping vehicle as the following vehicle and the vehicle pair falls under the separated pair, execute selection processing to select from a remaining vehicle group excluding the separated pair from the ride-sharing vehicle group an overtaking vehicle that overtakes the stopping vehicle to cut into the separated pair; and
     transmit an overtake instruction to the overtaking vehicle selected in the selection processing,
       wherein, in the selection processing, the management server configured to:
       extract a candidate of the overtaking vehicle from the remaining vehicle group;
       judge whether or not a pick-up and/or a drop-off of a user by the candidate is scheduled in a path from an actual position of the candidate to that of the stopping vehicle in the circular route; and
       when it is judged that the pick-up and/or the drop-off of the user by the candidate is not scheduled, decide the said candidate as the overtaking vehicle.

2. The ride-sharing system according to claim 1,
   wherein, in the selection processing, the management server further configured to:
   calculate respective time required from respective actual position of the vehicles constituting the remaining vehicle group to an interrupt position set between the separated pair in the circular route; and
   extract the candidate in an ascending order of the required time.

3. The ride-sharing system according to claim 1,
   wherein, in the interval adjustment processing, the management server further configured to:
   when it is judged that the pick-up and/or the drop-off of the user by the candidate is scheduled in all candidates, transmit a deceleration driving instruction to the remaining vehicle group.

4. The ride-sharing system according to claim 1,
   wherein, in the interval adjustment processing, the management server further configured to:
   in the transmission of the overtake instruction, transmit an acceleration driving instruction to a remaining vehicle group of the ride-sharing vehicle group excluding the separated pair, the overtaking vehicle, and a ride-sharing vehicle operated between the overtaking vehicle and the stopping vehicle.

5. The ride-sharing system according to claim 1,
   wherein the overtake instruction includes information of an interrupt position that is set in a middle of actual positions of the separated pair in the circular route,
   wherein, in the interval adjustment processing, the management server further configured to:
   in the transmission of the overtake instruction, transmit a deceleration driving instruction to the preceding vehicle of the separated pair.

6. The ride-sharing system according to claim 1,
   wherein, in the interval adjustment processing, the management server further configured to:
   when it is judged that the vehicle pair does not include the stopping vehicle as the following vehicle and the vehicle pair corresponds to the separated pair, transmit a deceleration driving instruction to the preceding vehicle of the separated pair while transmitting an acceleration driving instruction to the following vehicle of the separated pair.

7. The ride-sharing system according to claim 1, wherein, in the interval adjustment processing, the management server further configured to:
judge whether or not the vehicle pair falls under a proximity pair;
when the service frequency of the vehicle pair exceeds a minimum time, determine that the vehicle pair falls under the proximity pair; and
when it is judged that the vehicle pair corresponds to the proximity pair, transmit an acceleration driving instruction to the preceding vehicle of the proximity pair while transmitting a d deceleration driving instruction to the following vehicle of the proximity pair.

8. A ride-share method for providing a ride-share service, the ride-sharing method is performed by a management server which is configured to manage an operation of a ride-sharing vehicle group composed of at least three automated drive vehicles running on a circular route including at least two pick-up and drop-off points,
wherein, in the ride-sharing method, the management server is configured to execute interval adjustment processing to adjust a service frequency of the ride-sharing vehicle group based on operating state information of the ride-sharing vehicle group,
wherein, in the interval adjustment processing, the management server is configured to;
judge whether or not a vehicle pair composed of two vehicles in a relationship of a preceding vehicle and a following vehicle contain a stopping vehicle as the following vehicle that stops in any one of the at least two pick-up and drop-off points;
when it is judged that the vehicle pair contains the stopping vehicle as the following vehicle, judge whether or not the vehicle pair is a separated pair of which the service frequency exceeds a maximum time;
when it is judged that the vehicle pair corresponds to the separated pair, execute selection processing a selection processing to select from a remaining vehicle group excluding the separated pair from the ride-sharing vehicle group an overtaking vehicle that overtakes the stopping vehicle to cut into the separated pair; and
transmit an overtake instruction to the overtaking vehicle selected in the selection processing,
in the selection processing, the management server is configured to:
extract a candidate of the overtaking vehicle from the remaining vehicle group;
judge whether or not a pick-up and/or a drop-off of a user by the candidate is scheduled in a path from an actual position of the candidate to that of the stopping vehicle in the circular route; and
when it is judged that the pick-up and/or the drop-off of the user by the candidate is not scheduled, decide the said candidate as the overtaking vehicle.

* * * * *